(12) United States Patent
Connors et al.

(10) Patent No.: US 10,736,259 B2
(45) Date of Patent: *Aug. 11, 2020

(54) INDUCTOR BOX FOR AN AGRICULTURAL IMPLEMENT HAVING COMPRESSION LIMITERS

(71) Applicant: CNH Industrial America LLC, New Holland, PA (US)

(72) Inventors: Michael J. Connors, Lockport, IL (US); Chad M. Johnson, Arlington Heights, IL (US); Marvin A. Prickel, Homer Glen, IL (US)

(73) Assignee: CNH Industrial America LLC, New Holland, PA (US)

( * ) Notice: Subject to any disclaimer, the term of this patent is extended or adjusted under 35 U.S.C. 154(b) by 166 days.

This patent is subject to a terminal disclaimer.

(21) Appl. No.: 15/873,167

(22) Filed: Jan. 17, 2018

(65) Prior Publication Data

US 2018/0132415 A1    May 17, 2018

Related U.S. Application Data

(62) Division of application No. 14/882,593, filed on Oct. 14, 2015, now Pat. No. 9,901,025, which is a division
(Continued)

(51) Int. Cl.
*A01C 7/20* (2006.01)
*A01C 7/12* (2006.01)
(Continued)

(52) U.S. Cl.
CPC ............ *A01C 7/20* (2013.01); *A01C 7/042* (2013.01); *A01C 7/081* (2013.01); *A01C 7/084* (2013.01);
(Continued)

(58) Field of Classification Search
CPC .. A01C 7/20; A01C 7/00; A01C 7/042; A01C 7/04; A01C 7/081; A01C 7/08;
(Continued)

(56) References Cited

U.S. PATENT DOCUMENTS

| 3,189,371 A | 6/1965 | Swan |
| 3,195,906 A | 7/1965 | Moyers |
| 3,231,288 A | 1/1966 | Hensien |
| 3,799,080 A | 3/1974 | Horn |

(Continued)

FOREIGN PATENT DOCUMENTS

| WO | 1991001198 | 2/1991 |
| WO | 2001081797 | 11/2001 |

*Primary Examiner* — Christopher J. Novosad
(74) *Attorney, Agent, or Firm* — Rebecca L. Henkel; Rickard K. DeMille

(57) ABSTRACT

An inductor box for an agricultural implement having compression limiters. One inductor box includes a housing having a first side configured to receive an agricultural product from a tank. The first side has a sealable surface, and the sealable surface has plates attached thereto. The inductor box includes a first gasket disposed on the sealable surface and configured to establish a seal between the sealable surface and a corresponding surface of the tank. The plates are configured to extend through respective openings in the gasket, and to block compression of the first gasket beyond a desired compression limit.

15 Claims, 7 Drawing Sheets

Related U.S. Application Data of application No. 13/737,657, filed on Jan. 9, 2013, now Pat. No. 9,173,338.

(51) Int. Cl.
  *A01C 7/08* (2006.01)
  *A01C 7/04* (2006.01)

(52) U.S. Cl.
  CPC .......... *A01C 7/124* (2013.01); *Y10T 29/49448* (2015.01)

(58) Field of Classification Search
  CPC .......... A01C 7/084; A01C 7/124; A01C 7/123; A01C 7/12; Y10T 29/49448; Y10T 29/49
  USPC .......................................... 111/170, 174, 14
  See application file for complete search history.

(56) References Cited

U.S. PATENT DOCUMENTS

| | | | |
|---|---|---|---|
| 4,655,463 | A | 4/1987 | Inciong et al. |
| 4,867,461 | A | 9/1989 | Shimmell |
| 5,054,793 | A | 10/1991 | Hauenstein et al. |
| 5,735,532 | A | 4/1998 | Nolan et al. |
| 6,039,323 | A | 3/2000 | Mockenhaupt et al. |
| 6,161,840 | A | 12/2000 | Boardman et al. |
| 6,869,081 | B1 | 3/2005 | Jenco |
| 7,306,235 | B2 | 12/2007 | Roberts et al. |
| 7,976,074 | B2 | 7/2011 | Anderson et al. |
| 9,173,338 | B2 | 11/2015 | Connors et al. |
| 9,901,025 | B2 * | 2/2018 | Connors ................ A01C 7/124 |
| 2011/0204580 | A1 | 8/2011 | Tripathy |
| 2012/0112420 | A1 | 5/2012 | Stetter et al. |
| 2012/0187638 | A1 | 7/2012 | Bauer et al. |
| 2012/0193877 | A1 | 8/2012 | Okano et al. |

* cited by examiner

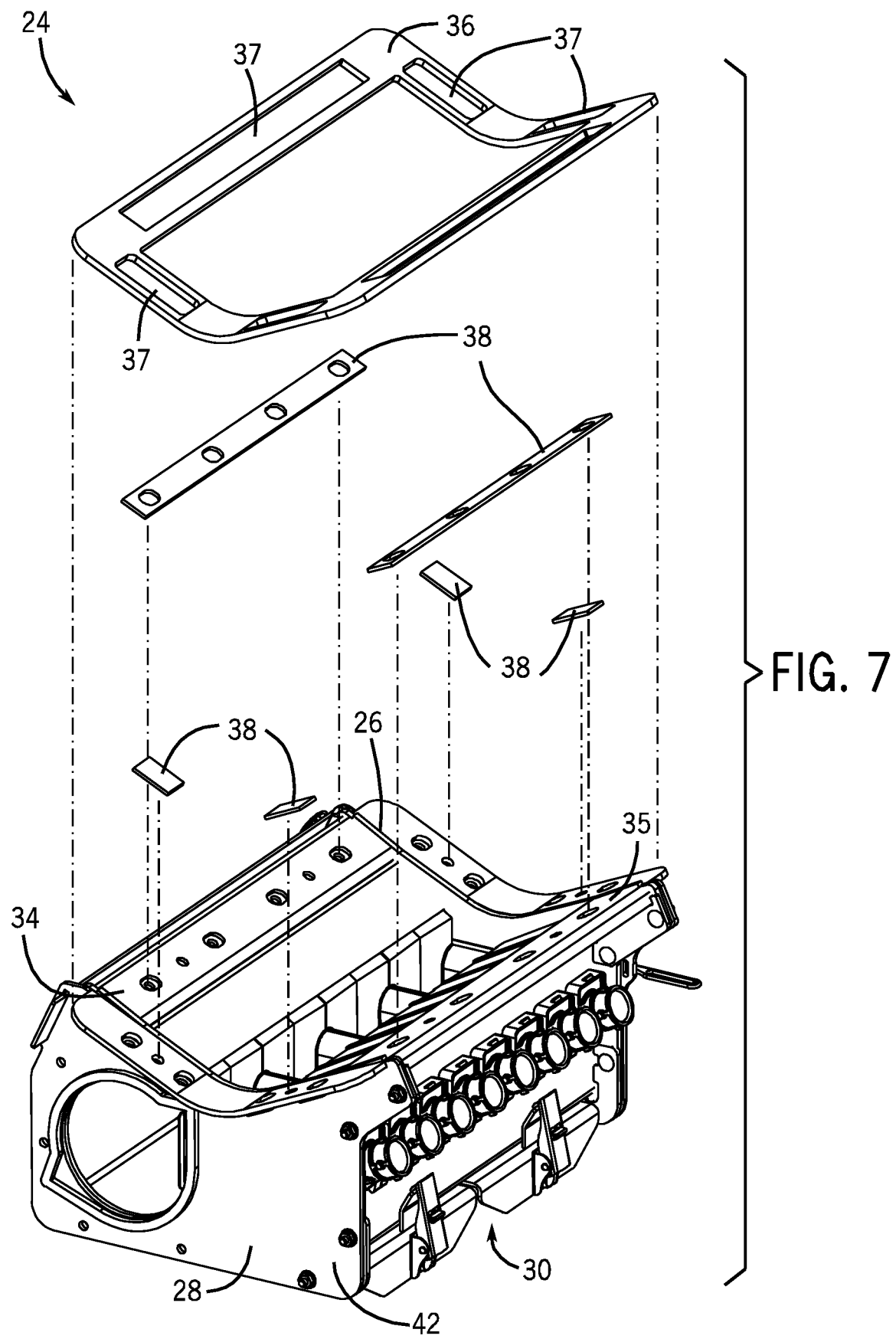

INDUCTOR BOX FOR AN AGRICULTURAL IMPLEMENT HAVING COMPRESSION LIMITERS

CROSS-REFERENCE TO RELATED APPLICATION

This application is a divisional of U.S. patent application Ser. No. 14/882,593, entitled "AN INDUCTOR BOX FOR AN AGRICULTURAL IMPLEMENT HAVING COMPRESSION LIMITERS", filed Oct. 14, 2015, which is a divisional of U.S. patent application Ser. No. 13/737,657, entitled "AN INDUCTOR BOX FOR AN AGRICULTURAL IMPLEMENT HAVING COMPRESSION LIMITERS", filed Jan. 9, 2013, now U.S. Pat. No. 9,173,338. Each of the above-referenced applications is herein incorporated by reference in its entirety.

BACKGROUND

The invention relates generally to ground working equipment, such as agricultural equipment, and more specifically, to an agricultural implement having an inductor box with compression limiters.

Generally, planting implements (e.g., planters) are towed behind a tractor or other work vehicle via a mounting bracket secured to a rigid frame of the implement. These planting implements typically include multiple row units distributed across the width of the implement. Each row unit is configured to deposit seeds at a desired depth beneath the soil surface, thereby establishing rows of planted seeds. For example, each row unit may include a ground engaging tool or opener (e.g., an opener disc) that forms a seeding path for seed deposition into the soil. In certain configurations, a gauge wheel is positioned a vertical distance above the opener to establish a desired trench depth for seed deposition into the soil. As the implement travels across a field, the opener excavates a trench into the soil, and seeds are deposited into the trench. In certain row units, the opener is followed by a packer wheel that packs the soil on top of the deposited seeds.

Certain planting implements include a remote seed tank, and a pneumatic distribution system configured to convey seeds from the tank to each row unit. For example, the pneumatic distribution system may include an inductor box positioned beneath the seed tank. The inductor box is configured to receive seeds from the tank, to fluidize the seeds into an air/seed mixture, and to distribute the air/seed mixture to the row units via a network of pneumatic hoses/conduits. Each row unit, in turn, receives the seeds from the pneumatic hoses/conduits, and directs the seeds to a metering system. The metering system is configured to provide a flow of seeds to a seed tube for deposition into the soil. By operating the metering system at a particular speed, a desired seed spacing may be established as the implement traverses a field.

The inductor box may include one or more gaskets for sealing a junction between the inductor box and an adjacent structure (e.g., to block airflow through the junction). For example, a gasket may be disposed at a junction between the inductor box and the seed tank. Unfortunately, the one or more gaskets of the inductor box may not provide an adequate seal when compressed above or below a desired compression range. Moreover, over compression of the one or more gaskets may decrease the usable life of such gaskets.

BRIEF DESCRIPTION

In one embodiment, an inductor box for an agricultural implement includes a housing having a first side configured to receive an agricultural product from a tank. The first side has a sealable surface, and the sealable surface has plates attached thereto. The inductor box includes a first gasket disposed on the sealable surface and configured to establish a seal between the sealable surface and a corresponding surface of the tank. The plates are configured to extend through respective openings in the gasket, and to block compression of the first gasket beyond a desired compression limit.

In another embodiment, an inductor box for an agricultural implement includes a housing having a first side configured to receive an airflow from an air supply. The first side has a sealable surface. The housing includes a set of tabs extending from the sealable surface. The inductor box also includes a first gasket disposed on the sealable surface and configured to establish a seal between the sealable surface and a first cover plate. The set of tabs are configured to block compression of the first gasket beyond a desired compression limit.

In a further embodiment, a method of manufacturing an inductor box includes forming a housing of the inductor box from a single sheet of metal. The method of manufacturing also includes forming a set of tabs on the housing. The set of tabs is configured to block compression of a first gasket coupled to a first end of the housing beyond a first desired compression limit, and to block compression of a second gasket coupled to a second end of the housing beyond a second desired compression limit.

DRAWINGS

These and other features, aspects, and advantages of the present invention will become better understood when the following detailed description is read with reference to the accompanying drawings in which like characters represent like parts throughout the drawings, wherein:

FIG. 7 is an exploded view of an embodiment of the inductor box of FIG. 2, illustrating compression limiters being attached to the housing of the inductor box.

DETAILED DESCRIPTION

Figure 1:
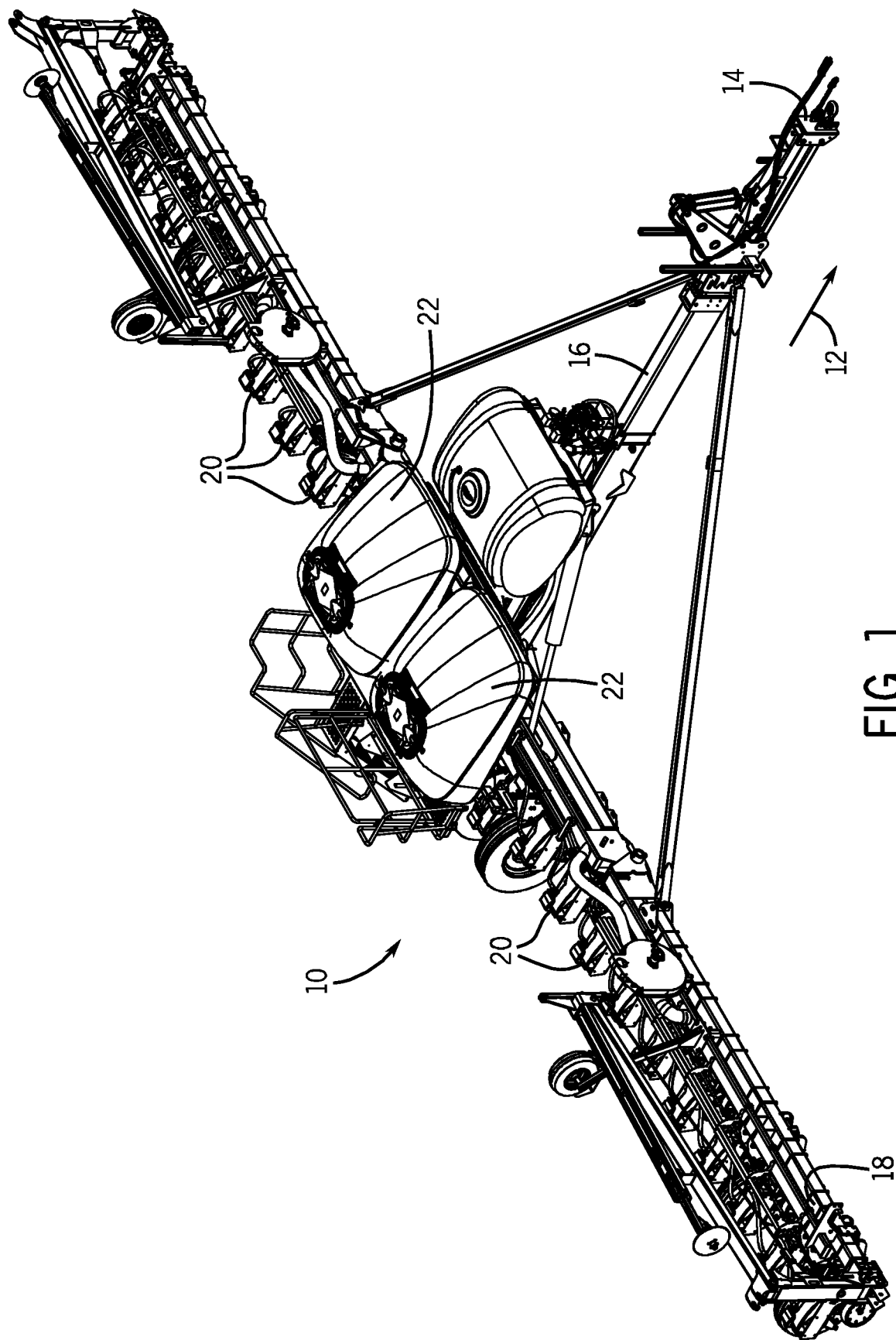
FIG. 1 is a perspective view of an embodiment of an agricultural implement configured to deposit seeds into a soil surface.

FIG. 1 is a perspective view of an embodiment of an agricultural implement 10 configured to deposit seeds into a soil surface. In the illustrated embodiment, the implement 10 is configured to be towed along a direction of travel 12 by a work vehicle, such as a tractor or other prime mover. The work vehicle may be coupled to the implement 10 by a hitch assembly 14. As illustrated, the hitch assembly 14 is coupled to a main frame assembly 16 of the implement 10 to facilitate towing of the implement 10 in the direction of travel 12. In the illustrated embodiment, the frame assembly 16 is coupled to a tool bar 18 that supports multiple row units 20. Each row unit 20 is configured to deposit seeds at a desired depth beneath the soil surface, thereby establishing rows of planted seeds. The implement 10 also includes seed tanks 22, and a pneumatic distribution system configured to convey seeds from the tanks to the row units 20. In certain embodiments, the pneumatic distribution system includes an inductor box positioned beneath each seed tank 22. Each inductor box is configured to receive seeds from a respective tank, to fluidize the seeds into an air/seed mixture, and to distribute the air/seed mixture to the row units 20 via a network of pneumatic hoses/conduits.

In certain embodiments, each row unit 20 includes a residue manager, an opening assembly, a seed tube, closing discs, and a press wheel. The residue manager includes a rotating wheel having multiple tillage points or fingers that break up crop residue, thereby preparing the soil for seed deposition. The opening assembly includes a gauge wheel and an opener disc. The gauge wheel may be positioned a vertical distance above the opener disc to establish a desired trench depth for seed deposition into the soil. As the row unit travels across a field, the opener disc excavates a trench into the soil for seed deposition. The seed tube, which may be positioned behind the opening assembly, directs a seed from a metering system into the excavated trench. The closing discs then direct the excavated soil into the trench to cover the planted seed. Finally, the press wheel packs the soil on top of the seed with a desired pressure.

While the illustrated implement 10 includes 24 row units 20, it should be appreciated that alternative implements may include more or fewer row units 20. For example, certain implements 10 may include 6, 8, 12, 16, 24, 32, or 36 row units, or more. In addition, the spacing between row units may be particularly selected based on the type of crop being planting. For example, the row units may be spaced 30 inches from one another for planting corn, and 15 inches from one another for planting soy beans.

The inductor box of the pneumatic distribution system may include one or more gaskets for sealing a junction between the inductor box and an adjacent structure (e.g., to block airflow through the junction). For example, a gasket may be disposed at a junction between the inductor box and the seed tank 22. Moreover, the inductor box may include compression limiting structures to block compression of the gasket beyond a desired compression limit. For example, the inductor box may include metal plates attached (e.g., bonded, welded, etc.) to a sealable surface of the inductor box. The metal plates may be configured to abut a surface of the seed tank 22 to block compression of the gasket beyond a desired compression limit.

In another example, a gasket may be disposed at a junction between a side of the inductor box and a cover plate. The side of the inductor box may include a set of tabs integrally formed as part of the housing of the inductor box. The set of tabs may abut the cover plate to block compression of the gasket beyond a desired compression limit. By blocking over compression of gaskets of the inductor box, a suitable seal may be provided at the junctions between the inductor box and an adjacent structure, thereby improving airflow through the inductor box. Thus, distribution of agricultural product through the pneumatic distribution system may be performed more efficiently. Furthermore, the longevity of the gaskets may be increased.

Figure 2:
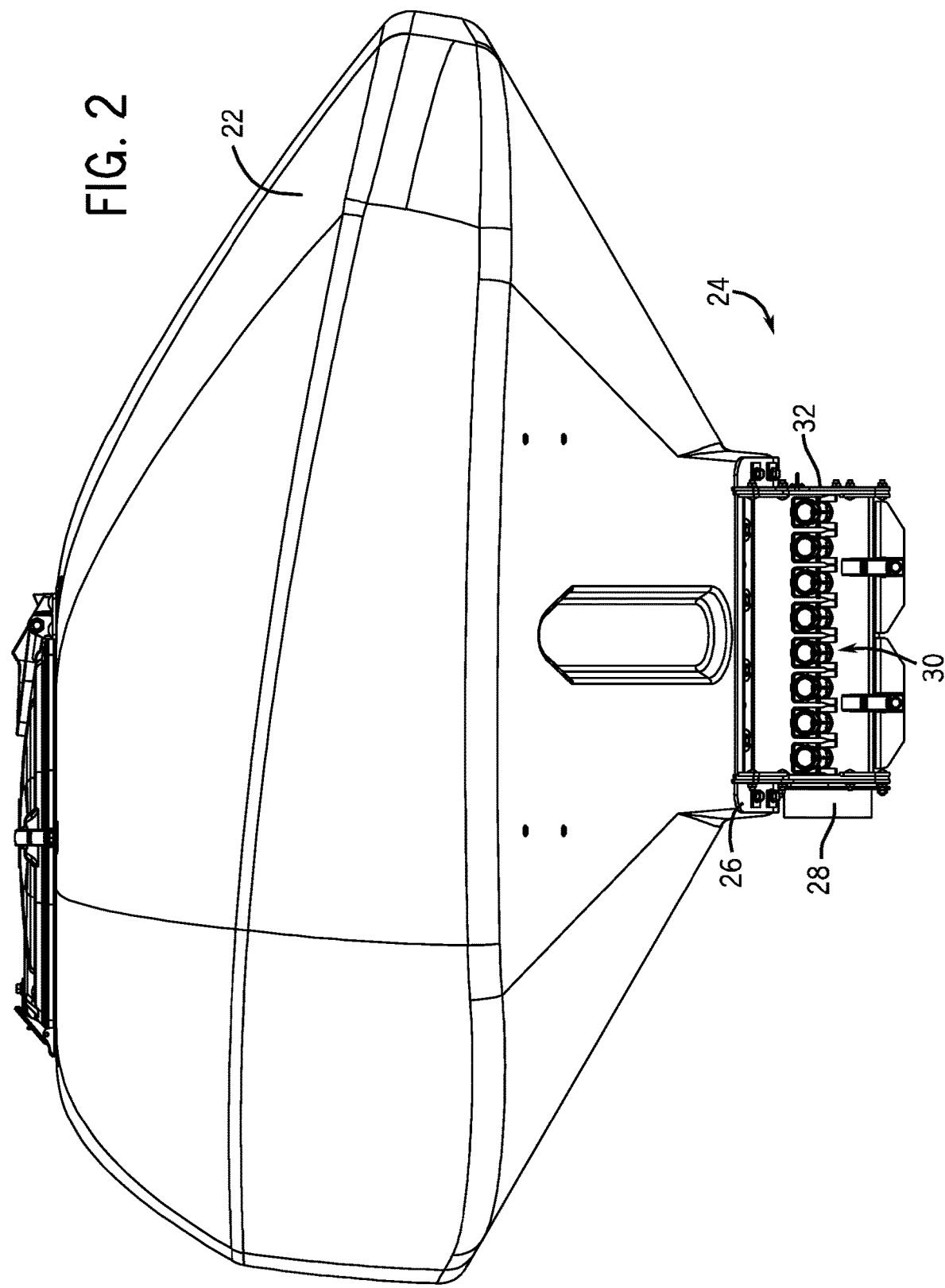
FIG. 2 is a side view of an embodiment of a seed tank of the agricultural implement of FIG. 1 having an inductor box positioned beneath the seed tank.

FIG. 2 is a side view of an embodiment of the seed tank 22 of the agricultural implement 10 of FIG. 1 having an inductor box 24 positioned beneath the seed tank 22. An upper side 26 of the inductor box 24 is attached to the seed tank 22 and configured to receive agricultural product (e.g., seed, fertilizer, etc.) from the seed tank 22. Moreover, a side 28 of the inductor box 24 is configured to be coupled to an air supply to receive an airflow for mixing air with the agricultural product. The air/agricultural product mixture is directed from the inductor box 24 toward row units 20 through output ports 30. As illustrated, the inductor box 24 includes a side 32 that may be sealed, thereby facilitating air/product flow to the output ports 30. Each of the sides 26, 28, and 32 may include a gasket for sealing the inductor box 24 to an adjacent structure. As discussed above, the inductor box 24 may also include compression limiters to block compression of the gaskets, beyond a desired compression limit, thereby improving the seal between the inductor box 24 and the adjacent structure.

Figure 3:
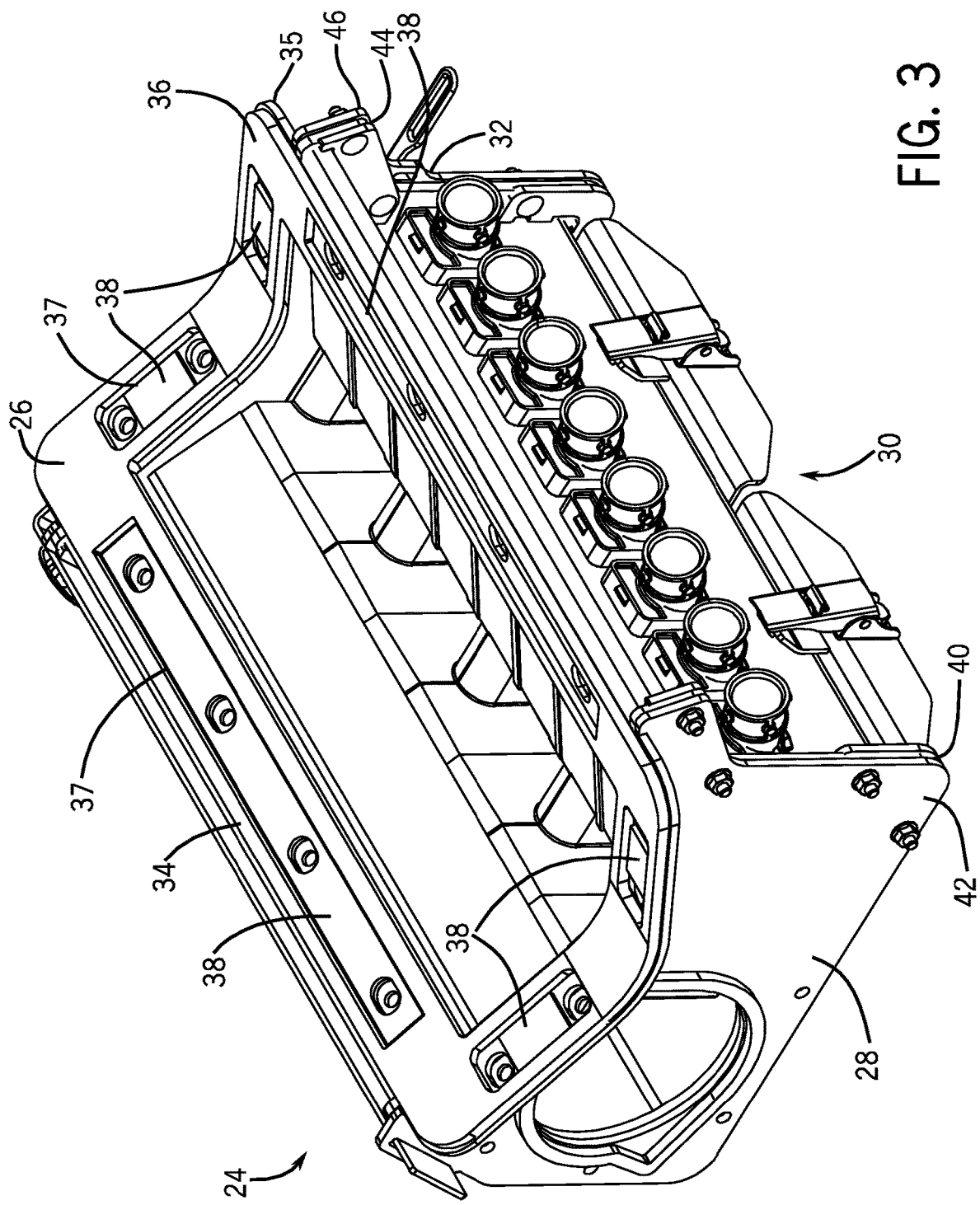
FIG. 3 is a perspective view of an embodiment of the inductor box of FIG. 2 having compression limiters.

FIG. 3 is a perspective view of an embodiment of the inductor box 24 of FIG. 2 having compression limiters. The inductor box 24 includes a housing 34 having a sealable surface 35 configured to be sealed to the seed tank 22. As illustrated, a gasket 36 is disposed on the sealable surface 35 and is configured to seal the junction between the sealable surface 35 and a corresponding surface of the seed tank 22. The gasket 36 includes openings 37 that enable compression limiters 38 to pass through and directly contact the seed tank 22. Accordingly, during assembly, the compression limiters 38 are configured to abut the seed tank 22 to block compression of the gasket 36 beyond a desired compression limit. The compression limiters 38 are attached to the sealable surface 35, such as by bonding, welding, and so forth. Moreover, the compression limiters 38 may be manufactured using any suitable material (e.g., metal, polymer, etc.). For example, in certain embodiments, the compression limiters 38 may be metal plates that are welded to the sealable surface 35. In other embodiments, the compression limiters 38 may be polymer plates that are bonded to the sealable surface 35. Although six compression limiters 38 are illustrated with at least one compression limiter 38 on each side of a perimeter of the sealable surface 35, the inductor box 24 may have more or fewer compression limiters 38 disposed at any suitable position on the sealable surface 35.

The side 28 of the inductor box 24 includes a gasket 40 that seals a cover plate 42 to the housing 34 of the inductor box 24. Moreover, the side 32 includes a gasket 44 that seals a cover plate 46 to the housing 34 of the inductor box 24. Each side 28 and 32 may include compression limiters to block compression of the gaskets 40 and 44 beyond a desired compression limit. By using compression limiters on the inductor box 24, the sealing of junctions may be improved, thereby facilitating improved efficiency of the inductor box 24.

Figure 4:
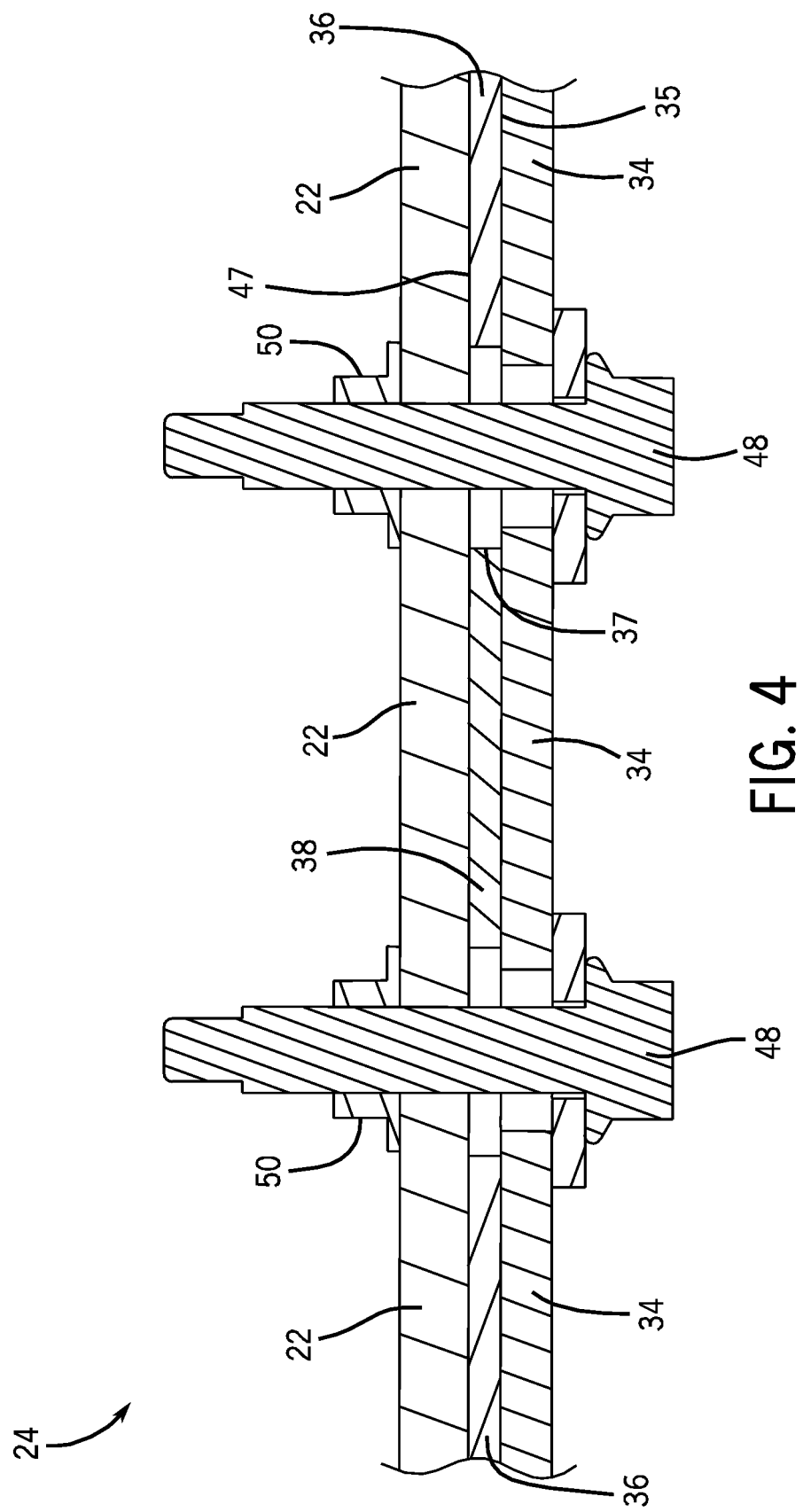
FIG. 4 is a cross-sectional view of an embodiment of the inductor box of FIG. 2 having a compression limiter.

FIG. 4 is a cross-sectional view of an embodiment of the inductor box 24 of FIG. 2 having the compression limiter 38. As illustrated, the gasket 36 is disposed between the sealable surface 35 of the housing 34 and a corresponding surface 47 of the seed tank 22. The compression limiter 38 is disposed within one of the openings 37 in the gasket 36. In the illustrated embodiment, bolts 48 and nuts 50 are used to secure the inductor box 24 to the seed tank 22. As the bolts 48 are tightened, the gasket 36 is compressed between the sealable surface 35 and the corresponding surface 47 of the seed tank 22. After the gasket 36 is compressed to a desired compression limit, the compression limiter 38 abuts the sealable surface 35 and the corresponding surface 47 of the seed tank 22, thereby blocking further compression of the gasket 36. Thus, the gasket 36 is not over compressed. As may be appreciated, a thickness of the compression limiter 38 is selected based on the desired compression limit of the gasket 36. By blocking over compression of the gasket 36, the longevity of the gasket 36 may be increased.

Figure 5:
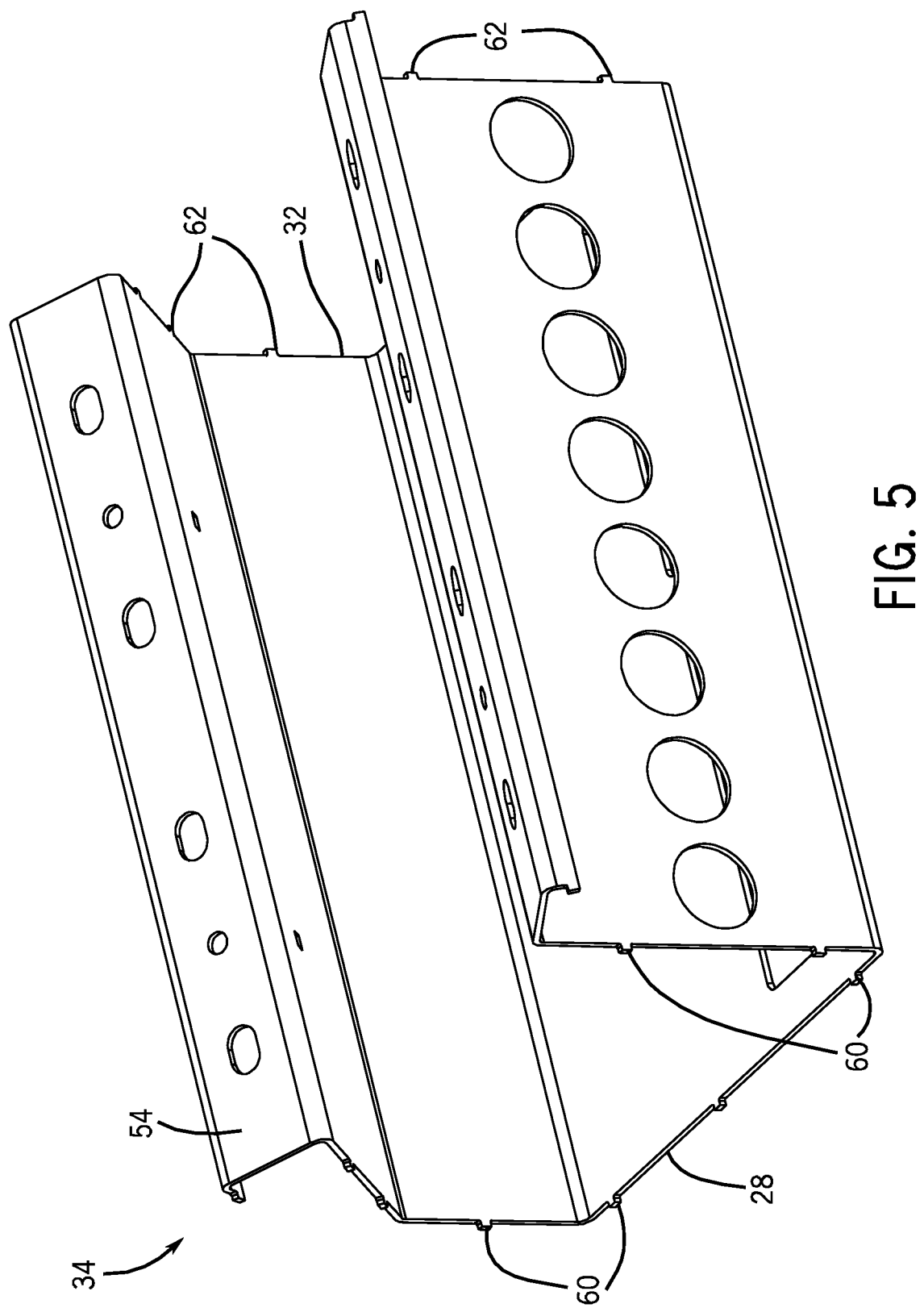
FIG. 5 is a perspective view of an embodiment of a housing of the inductor box of FIG. 2 having integrated compression limiters.

FIG. 5 is a perspective view of an embodiment of the housing 34 of the inductor box 24 of FIG. 2 having integrated compression limiters. As illustrated, the housing 34 includes sides 54, 28, and 32. In certain embodiments, the housing 34 may be formed from a single piece of material. For example, the housing 34 may be formed from a single sheet of metal by bending the metal to form the sides 54, 28, and 32. The housing 34 includes compression limiters 60 and 62 (e.g., tabs) extending from respective sides 28 and 32. The compression limiters 60 and 62 may be integrally formed as part of the housing 34. For example, the compression limiters 60 and 62 may be formed by cutting the single piece of material used to form the housing 34 into a desired shape. Thus, the compression limiters 60 and 62 may be built into the housing 34.

Figure 6:
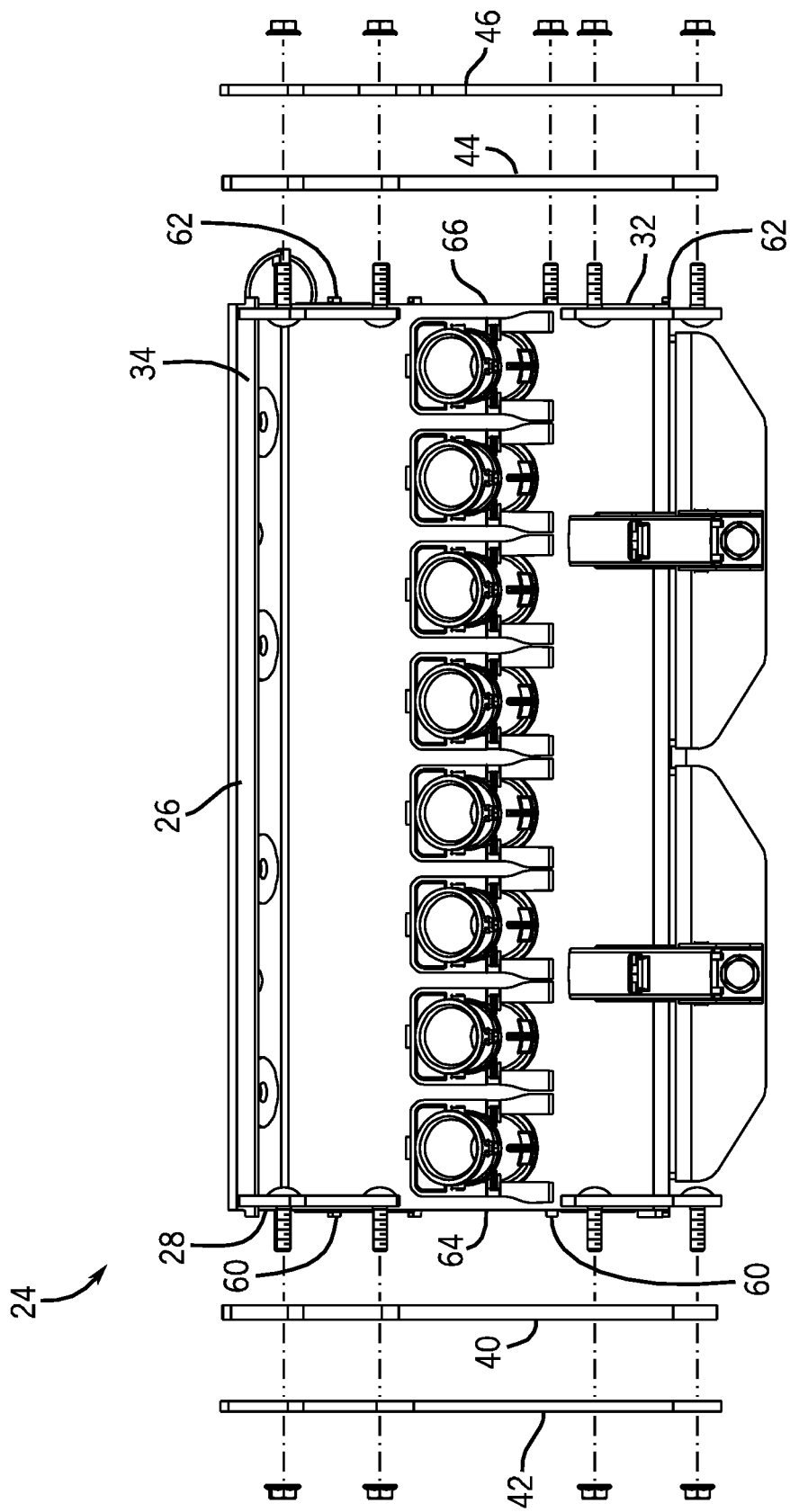
FIG. 6 is an exploded view of an embodiment of the inductor box of FIG. 2 having a housing with integrated compression limiters.

FIG. 6 is an exploded view of an embodiment of the inductor box 24 of FIG. 2 having the housing 34 with integrated compression limiters 60 and 62. The housing 34 includes a sealable surface 64 on the side 28. The compression limiters 60 extend from the sealable surface 64. During assembly, the cover plate 42 is attached to the side 28 with the gasket 40 disposed between the sealable surface 64 and the cover plate 42. The compression limiters 60 abut the cover plate 42 to block compression of the gasket 40 beyond a desired compression limit.

Moreover, the housing 34 includes a sealable surface 66 on the side 32. The compression limiters 62 extend from the sealable surface 66. During assembly, the cover plate 46 is attached to the side 32, with the gasket 44 disposed between the sealable surface 66 and the cover plate 46. The compression limiters 62 abut the cover plate 46 to block compression of the gasket 44 beyond a desired compression limit.

FIG. 7 is an exploded view of an embodiment of the inductor box 24 of FIG. 2, illustrating compression limiters 38 being attached to the housing 34 of the inductor box 24. As illustrated, the compression limiters 38 are attached to the sealable surface 35 of the housing 34. For example, the compression limiters 38 may be metal plates that are welded or bonded to the housing 34. The gasket 36 is disposed on the sealable surface 35 such that the compression limiters 38 extend through openings 37 in the gasket 36. Once the gasket 36 is disposed on the sealable surface 35, the inductor box 24 may be attached to the seed tank 22. While the inductor box 24 is being attached to the seed tank 22, the compression limiters 38 are configured to abut the surface 47 of the seed tank 22, and to block compression of the gasket 36 beyond a desired compression limit.

As described herein, the compression limiters 38, 60, and 62 may enable proper compression of the gaskets 36, 40, and 44, and may block over compression of the gaskets 36, 40, and 44. Thus, the gaskets 36, 40, and 44 may be properly compressed, and may provide a desired seal. As such, the longevity of the gaskets may be increased by decreasing wear on the gaskets. Moreover, distribution of agricultural product through the pneumatic distribution system may be performed more efficiently due to reduced losses through the junctions.

The term "desired compression limit" as used herein may refer to a compression ratio, a compression distance, a compression force, etc. For example, the compression ratio may refer to an amount the gasket is compressed relative to an amount that the gasket is capable of being compressed. Furthermore, the compression ratio may refer to a compressed thickness of the gasket relative to an uncompressed thickness of the gasket. As described above, a desired compression ratio may be a thickness of the compression limiters 38 and/or the compression limiters 60 relative to an uncompressed thickness of the gasket that is within a suitable use range for the gasket. As another example, a compression distance may be the difference between a compressed thickness of the gasket and an uncompressed thickness of the gasket. As described above, a desired compression distance may be a difference between an uncompressed thickness of the gasket and the thickness of the compression limiters 38 and/or the compression limiters 60 that is within a suitable use range for the gasket. A compression force may be an amount of force needed to compress a gasket. For example, a desired compression force may be an amount of force needed to compress an uncompressed gasket to the thickness of the compression limiters 38 and/or the compression limiters 60 that is within a suitable use range for the gasket. As may be appreciated, a data sheet or other specification material for a gasket may define suitable compression ratios, compression distances, and/or compression forces for the gasket.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of manufacturing an inductor box, comprising:
    forming at least a portion of a housing of the inductor box from a single sheet of material; and
    forming a plurality of tabs on the housing, wherein the plurality of tabs is integrally formed on the single sheet of material, and the plurality of tabs extends from a first sealable surface on a first side of the housing;
    disposing a first gasket on the first sealable surface;
    disposing a first cover plate on the first gasket, such that the first gasket establishes a first seal between the first sealable surface and a corresponding surface of the first cover plate;
    wherein the plurality of tabs is configured to abut the corresponding surface of the first cover plate to block compression of the first gasket.

2. The method of claim 1, comprising coupling the first cover plate to the housing.

3. The method of claim 1, comprising coupling a plurality of plates directly to a second sealable surface of a second side of the housing, wherein the plurality of plates is configured to block compression of a second gasket coupled to the second side of the housing beyond a second compression limit.

4. The method of claim 3, comprising attaching a tank to the second side of the housing.

5. The method of claim 4, wherein each plate of the plurality of plates is configured to extend through a respective opening in the second gasket to directly contact a corresponding surface of the tank.

6. The method of claim 5, comprising attaching the second gasket to the second sealable surface such that each plate of the plurality of plates extends through the respective opening, wherein the second gasket is configured to engage the corresponding surface of the tank.

7. The method of claim 3, wherein coupling the plurality of plates directly to the second sealable surface comprises welding or bonding at least one of the plurality of plates to the second sealable surface.

8. The method of claim 3, wherein the plurality of plates comprises at least four plates.

9. The method of claim 1, wherein a portion of the plurality of tabs extends from a third sealable surface on a third side of the housing.

10. The method of claim 9, comprising:
disposing a third gasket on the third sealable surface;
disposing a second cover plate on the third gasket, such that the third gasket establishes a second seal between the third sealable surface and a corresponding surface of the second cover plate;
wherein the portion of the plurality of tabs is configured to abut the corresponding surface of the second cover plate to block compression of the third gasket beyond a third compression limit.

11. The method of claim 10, comprising coupling the second cover plate to the housing.

12. A method of manufacturing an inductor box, comprising:
forming at least a portion of a housing of the inductor box from a single sheet of material;
forming a plurality of tabs on the housing, wherein the plurality of tabs is integrally formed on the single sheet of material, and the plurality of tabs is configured to block compression of a first gasket coupled to a first end of the housing beyond a first compression limit and to block compression of a second gasket coupled to a second end of the housing beyond a second compression limit; and
welding a plurality of plates to a third end of the housing, wherein the plurality of plates is configured to block compression of a third gasket coupled to the third end of the housing beyond a third compression limit.

13. The method of claim 12, comprising attaching the first gasket to the first end of the housing and attaching the second gasket to the second end of the housing.

14. The method of claim 13, comprising attaching a first cover plate to the first gasket and attaching a second cover plate to the second gasket.

15. The method of claim 12, comprising attaching a tank to the third end of the housing.

* * * * *